(12) United States Patent
Thomas

(10) Patent No.: US 8,408,957 B2
(45) Date of Patent: Apr. 2, 2013

(54) TSUNAMI SURVIVAL SHELTER

(76) Inventor: Mary Thomas, Edmonds, WA (US)

( * ) Notice: Subject to any disclaimer, the term of this patent is extended or adjusted under 35 U.S.C. 154(b) by 0 days.

(21) Appl. No.: 13/102,855

(22) Filed: May 6, 2011

(65) Prior Publication Data

US 2012/0282829 A1    Nov. 8, 2012

(51) Int. Cl.
*B63B 35/58* (2006.01)
(52) U.S. Cl. ......................................................... 441/38
(58) Field of Classification Search .............. 441/80, 441/87, 35, 38; 114/348, 349; 52/169.1, 52/169.9, 169.13, 170
See application file for complete search history.

(56) References Cited

U.S. PATENT DOCUMENTS

| | | | | |
|---|---|---|---|---|
| 1,199,891 A | * | 10/1916 | Hayes | 441/35 |
| 2009/0125316 A1 | * | 5/2009 | Moore | 705/1 |

* cited by examiner

*Primary Examiner* — Edwin Swinehart
(74) *Attorney, Agent, or Firm* — Perkins Coie LLP

(57) ABSTRACT

Technology is disclosed for tsunami survival shelters. In various embodiments, a tsunami survival shelter comprises a vertical support column designed to withstand forces exerted by anticipated tsunamis and accompanying debris field; a buoyant inflatable survival life raft removably attached near a top portion of the vertical support column and capable of floating free from the vertical support column, and thereby protecting the occupants in the event of failure or overtopping of the support column; and adornments and coloring to allow the vertical support column and survival raft to blend with their surroundings by imitating trees indigenous to the area.

8 Claims, 1 Drawing Sheet

TSUNAMI SURVIVAL SHELTER

TECHNICAL FIELD

The disclosed technology relates to a tsunami survival shelter. More particularly, the technology relates to a low cost survival shelter for providing one or more persons refuge from tsunamis or other adverse natural phenomena.

BACKGROUND

The 2011 Fukushima earthquake resulted in a tsunami that left upwards of 20,000 people dead or missing in Japan. Since that tragedy, it has become apparent that the available reaction time to publicly broadcast warnings of impending tsunamis is very brief, e.g., less than 15 minutes. In that short time, people must leave areas that are susceptible to tsunamis, e.g., coastlines.

Although Japan is one of the most economically advanced nations, and the area affected was widely recognized as being subject to major tsunamis, Japan was still unable to marshal sufficient economic resources to place conventional tsunami shelters within reach of the general public.

Conventional tsunami shelters rely on mass and height to protect the occupants. These reinforced concrete structures are by their nature expensive to build and therefore tax public resources. Additionally, they meet public resistance due to their incompatibility with the architecture present in residential neighborhoods where they are needed the most.

As a result, conventional tsunami shelters are generally not deployed in large numbers and sufficiently close to the population to allow universal, access to such a shelter within the very short time frames provided by tsunami warning systems.

BRIEF DESCRIPTION OF THE DRAWINGS

For a more complete understanding of the disclosed technology, the drawings herein illustrate various embodiments. The drawings, however, do not limit the scope of the invention, Similar references in the drawings indicate similar elements.

DETAILED DESCRIPTION

In the following detailed description, numerous specific details are set forth in order to provide a thorough understanding of the disclosed technology. However, those skilled in the art will understand that the disclosed technology may be practiced without these specific details, that the disclosed technology is not limited to the depicted embodiments, and that the disclosed technology may be practiced in a variety of alternative embodiments. In other instances, well known methods, procedures, components, and systems have not been described in detail.

The disclosed technology provides a low cost and architecturally compatible tsunami shelter to allow its deployment in large numbers and sufficiently close to population centers to allow universal access within the very short time frames provided by tsunami warning systems. The shelter disclosed herein provides several features alone or in combination that are unavailable in prior designs, as defined by the appended claims.

Figure 1:
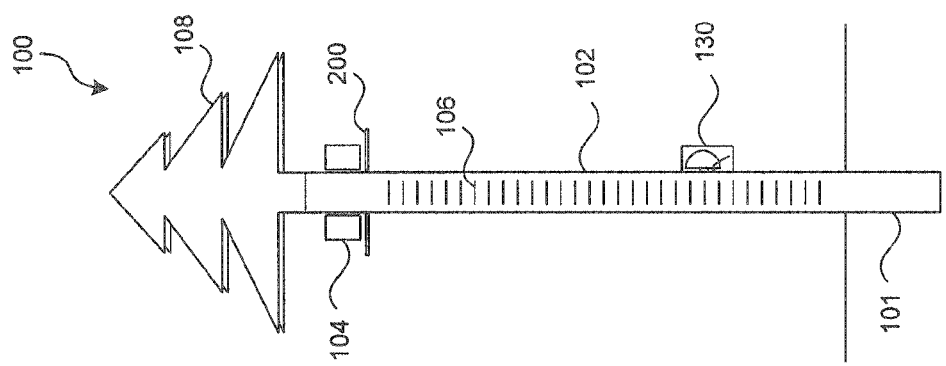
FIG. 1 is a cross-sectional view of the tsunami shelter in its dormant state.

Turning now to the Figures, FIG. 1 is a cross-sectional view of the tsunami shelter in its dormant state. A stationary tsunami survival shelter 100 includes a single pole support structure 102 (e.g., a vertical support column) upon which rests a specially configured inflatable survival raft 104 large enough to hold one or more people and/or other objects. The pole structure includes an integrated ladder 106 allowing access to the survival raft 104. The survival raft may be initially packaged in a disc configuration when it is in its dormant state. The survival raft 104 may be inflated by use of an activation lever positioned at the base of the single pole structure 102 (not illustrated) or below a platform 200. The survival raft 104 can be configured with an opening above the ladder 106 so as to allow access to the inflated raft by persons ascending the pole 106 to seek shelter. The survival raft 104 is attached to the top of the pole structure 102 in such a manner to allow its disengagement from the pole structure 102 in the event the magnitude of the tsunami and accompanying debris field is large. As an example, if the tsunami or the debris field has sufficient force to dislodge the pole structure 102 from its foundation 101, the survival raft 104 could disengage from the pole structure 102 and become free floating, thereby continuing to provide sanctuary for the occupants.

In some embodiments, the pole structure 102 is a mass-produced steel cylindrical column designed to withstand forces exerted by potential tsunamis. In various embodiments, the steel column is disguised by the use of artificial foliage components 108 similar to those found in commercially available artificial Christmas trees or palm trees.

In some embodiments, the survival raft 104 is placed atop an existing utility pole without necessarily disguising its intended purpose.

In various embodiments, the survival raft 104 includes additional, features to enhance survivability in the event the raft were to be swept out to sea by a receding tsunami, including communications devices, locator beacon, weather canopy, insulation, blankets, inflatable floor, seating with restraints, food and water rations, horn, strobe lights, signal flares, and so forth.

In various embodiments, the pole structure 102 includes additional features to prevent unauthorized use and vandalism including fire alarm type glass enclosed activation levers with audible alarms 130.

The base of the pole structure 102 can be embedded in the earth, attached to an existing concrete slab so as to prevent it from being dislodged by the anticipated tsunami and debris field, or otherwise attached to a foundation 101. The diameter of the pole structure 102 and material can be determined by the forces expected to be exerted by the tsunami for that area, and may be formed with steel, aluminum, concrete, wood or other construction material. The height of the pole structure can be determined by the expected height of the tsunami for the particular area. The ladder 106 can be either fixed or retractable. The inflatable survival shelter can be configured similarly to those commercially available for commercial and recreational sailing vessels. It can be attached to the pole structure 102 at sufficient height to avoid the anticipated level of inundation by the tsunami. The survival raft 104 can be inflated by a compressed air cylinder and can contain an access hole aligned with the access ladder 106 attached to the supporting column, The inflated raft can rest on a support ring or platform 200 semi-permanently attached to the column, and can float free from the pole structure 102 and support ring or platform 200 in the event it is overtopped by an unexpectedly large tsunami, or in the event the pole structure 102 is broken or dislodged.

The pole structure 102, support ring or platform 200, and survival raft 104 may be disguised by the use of artificial foliage components similar to those found in commercially available Christmas trees or palm trees. Similarly, the pole structure 102 may be camouflaged with surface treatments to resemble tree bark. Upon deployment, the survival raft 104 can be colored international orange for visibility to potential rescuers.

In various embodiments, the pole structure 102 is preferably between 10 and 40 feet in height. In other embodiments, the pole structure 102 can be taller or shorter, e.g., to suit expected tsunami heights. The size of the support raft 104 and support ring or platform 200 can vary with the occupant capacity and can accommodate between 1 and 50 persons in various embodiments. The size, and cost of the structure can allow it to be installed by individual households and businesses seeking to increase the protection of their family members and employees.

In some embodiments, the survival raft 104 can contain a mesh floor and ceiling which can allow it to float and protect the occupants in either an upright or capsized orientation and can contain lifting eyes on both sides to allow helicopter rescue of the entire raft and occupants at one time.

In some embodiments, the sides of inflatable raft can contain numerous separate air chambers so as to allow the raft to continue to float in the event that one or more chambers are punctured or deflate.

Figure 2:
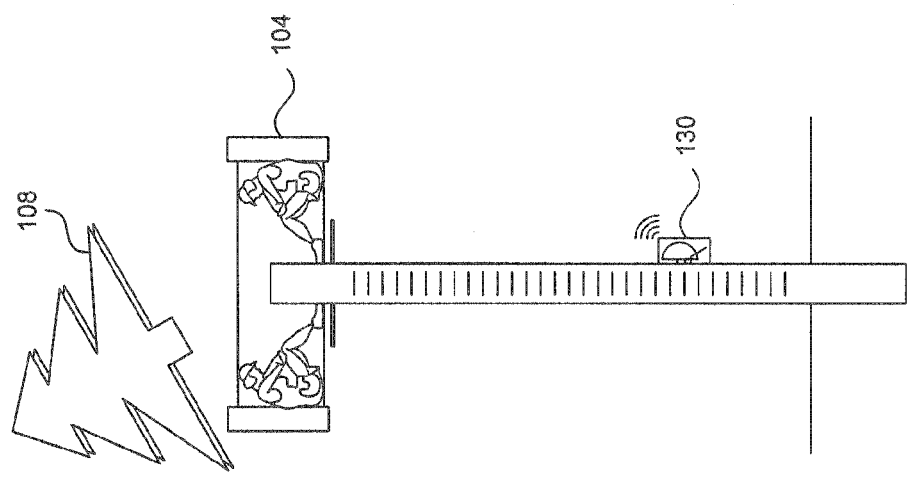
FIG. 2 is a cross-sectional view of the tsunami shelter in its deployed state.

FIG. 2 is a cross-sectional view of the tsunami shelter in its deployed state.

One skilled in the art will understand that various modifications are possible. Thus, the invention is not limited by the specification, but rather defined by the following claims

I claim:

1. A tsunami survival shelter, comprising:
    (a) a vertical column designed to withstand forces exerted by anticipated tsunamis and accompanying debris field;
    (b) a buoyant inflatable survival raft removably attached near a top portion of the vertical column and capable of floating free from the vertical column, thereby protecting the occupants in the event of failure or overtopping of the vertical column;
    (c) adornments and coloring to allow the vertical column and survival raft to blend with their surroundings by imitating trees indigenous to the area.

2. The tsunami survival shelter of claim 1, wherein said vertical column has integrated therewith a ladder allowing persons to ascend the column to access the life raft.

3. The tsunami survival shelter of claim 1, wherein said vertical column has a platform of sufficient size to support the survival raft and its occupants after inflation of the survival raft.

4. The tsunami survival shelter of claim 1, wherein said vertical column is equipped with a fire-alarm type glass-enclosed activation lever with audible alarm.

5. The tsunami survival shelter of claim 1, wherein said survival raft has removably attached thereto an apparatus allowing its inflation by use of air.

6. The tsunami survival shelter of claim 1, wherein said survival raft is an inflatable disc with a floor and ceiling allowing it to float and to protect and restrain the occupants in either an upright or capsized orientation.

7. The tsunami survival shelter of claim 1, wherein said survival raft contains an opening to accommodate the support column and keep the raft centered on the support column unless or until the column were to fail or be overtopped by a tsunami.

8. The tsunami survival shelter of claim 1, wherein said survival raft has stored therein communications devices, a locator beacon, weather canopy, seating with restraints, insulation blankets, inflatable floor, food and water rations, horn, strobe lights, and/or signal flares.

* * * * *